US012347242B1

(12) United States Patent
Bryukhan et al.

(10) Patent No.: US 12,347,242 B1
(45) Date of Patent: Jul. 1, 2025

(54) SYSTEMS AND METHODS FOR IDENTIFYING DIAGNOSTIC TROUBLE CODE CYCLES

(71) Applicant: Geotab Inc., Oakville (CA)

(72) Inventors: Vladyslav Oleksandrovic Bryukhan, Munich (DE); Michael Angelo David Santorelli, Concord (CA); Lourd Arun Raj, Pierrefonds (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/052,793

(22) Filed: Feb. 13, 2025

Related U.S. Application Data

(60) Provisional application No. 63/553,020, filed on Feb. 13, 2024.

(51) Int. Cl.
*G07C 5/00* (2006.01)
*G07C 5/08* (2006.01)

(52) U.S. Cl.
CPC ........... *G07C 5/006* (2013.01); *G07C 5/0808* (2013.01); *G07C 5/0816* (2013.01); *G07C 5/085* (2013.01)

(58) Field of Classification Search
CPC .... G07C 5/006; G07C 5/0808; G07C 5/0816; G07C 5/085
See application file for complete search history.

(56) References Cited

U.S. PATENT DOCUMENTS

2022/0269669 A1* 8/2022 Parmar ................ G06F 16/215

* cited by examiner

*Primary Examiner* — Michael V Kerrigan
(74) *Attorney, Agent, or Firm* — Gabriel F. Rogers

(57) ABSTRACT

Described herein are systems and methods for identifying a diagnostic trouble code (DTC) cycle for a vehicle. In an embodiment, one such method may comprise operating at least one processor to: receive telematics data originating from a plurality of telematics devices installed in a plurality of vehicles; identify, using the telematics data, a DTC generated by one or more of the plurality of vehicles, each DTC having a DTC status associated therewith; determine, for each DTC, the ignition cycle during which the DTC was generated; identify, for each DTC, a DTC status cycle by merging consecutive ignition cycles during which the DTC is generated with a consistent DTC status associated therewith; and identify, for each DTC, a DTC cycle based at least in part on each DTC status cycle identified for the DTC.

15 Claims, 4 Drawing Sheets

SYSTEMS AND METHODS FOR IDENTIFYING DIAGNOSTIC TROUBLE CODE CYCLES

CROSS-REFERENCE TO RELATED APPLICATIONS

This application claims priority to and the benefit of U.S. Patent Application Ser. No. 63/553,020, filed on Feb. 13, 2024, which is hereby incorporated by reference in its entirety.

TECHNICAL FIELD

The present disclosure generally relates to vehicle diagnostics. More specifically, the present disclosure relates to the identifying of diagnostic trouble code cycles of a vehicle.

BACKGROUND

Today, many vehicles rely on computer-based systems (e.g., one or more processors) for their operation. As will be appreciated, such systems manage and/or produce many types of data associated with various aspects of the vehicle during the operation thereof that may generally be referred to as "telematics data". As will be described herein, telematics data may include any information, parameters, attributes, characteristics, and/or features associated with the vehicle and may be obtained therefrom using, for example, a telematics device.

Telematics data may be used for a variety of applications. For example, telematics data is often used to determine, and maintain, the operability of a vehicle. In more detail, telematics data such as, but not limited to, engine data, fluid level data, brake data, transmission data, and the like may be used to determine that a vehicle requires maintenance before the operability of the vehicle is impacted (e.g., a breakdown). One type of telematics data that may be useful for assessing vehicle operability are Diagnostic Trouble Codes (DTCs), which are generally strings of letters and numbers generated by a vehicle when a potential operational issue is detected (e.g., by the computer-based systems thereof). That is, each DTC generated by a vehicle may indicate that a particular operational issue may have been detected.

However, while DTCs may be a useful type of telematics data for determining, maintaining, etc. the operability of a vehicle, vehicles often incorrectly generate, and/or periodically incorrectly cease generating, DTCs. For example, vehicle may incorrectly generate a DTC, or incorrectly cease generating a DTC, due to an error with a sensor thereof (e.g., caused by the movement of the vehicle). As a result, the lifespan of (or, put differently, cycle of) a DTC generated by a vehicle is often misrepresented, limiting the usefulness of generated DTCs for assessing vehicle operability.

A need therefore exists for improved systems and methods for identifying DTC cycles.

SUMMARY

In one aspect, the present disclosure relates to a system for identifying a diagnostic trouble code (DTC) cycle of a vehicle, the system comprising: at least one data storage operable to store telematics data originating from a plurality of telematics devices installed in a plurality of vehicles; and at least one processor in communication with the at least one data storage, the at least one processor operable to: identify, using the telematics data, a DTC generated by one or more of the plurality of vehicles, each DTC having a DTC status associated therewith; determine, for each DTC, the ignition cycle during which the DTC was generated; identify, for each DTC, a DTC status cycle by merging consecutive ignition cycles during which the DTC is generated with a consistent DTC status associated therewith; and identify, for each DTC, a DTC cycle based at least in part on each DTC status cycle identified for the DTC.

According to an embodiment, the at least one processor is further operable to aggregate identical DTCs having different DTC statuses associated therewith generated during the same ignition cycle to thereby generate an aggregated DTC having an aggregated DTC status associated therewith.

According to a further embodiment, the at least one processor is operable to determine the ignition cycle during which the DTC is generated by: identifying the ignition cycle based on a time of engaging an ignition of the vehicle, and a time of disengaging the ignition of the vehicle; and determining that the DTC is generated after the time of engaging the ignition of the vehicle and before the time of disengaging the ignition of the vehicle or within a predetermined threshold of time after the time of disengaging the ignition of the vehicle.

According to a further embodiment, the at least one processor is operable to identify the DTC status cycle by: identifying each ignition cycle during which the DTC with the consistent DTC status associated therewith is generated; and merging the consecutive ignition cycles during which the DTC with the consistent DTC status is generated such that a start time of a first ignition cycle of the consecutive ignition cycles corresponds to a start time of the DTC status cycle and an end time of a last ignition cycle of the consecutive ignition cycles corresponds to an end time of the DTC status cycle.

According to a further embodiment, the at least one processor is further operable to identify the DTC status cycle by: identifying each ignition cycle completed by the vehicle within a selected time period; and filtering any ignition cycles occurring within the selected time period that do not meet a predetermined condition.

According to a further embodiment, the predetermined condition comprises a minimum ignition cycle time, a minimum number of DTCs generated during the ignition cycle, or a combination thereof.

According to a further embodiment, the at least one processor is operable to identify the DTC cycle by merging consecutive DTC status cycles identified for the DTC.

In another aspect, the present disclosure relates to a method for identifying a diagnostic trouble code (DTC) cycle of a vehicle, the method comprising operating at least one processor to: receive telematics data originating from a plurality of telematics devices installed in a plurality of vehicles; identify, using the telematics data, a DTC generated by one or more of the plurality of vehicles, each DTC having a DTC status associated therewith; determine, for each DTC, the ignition cycle during which the DTC was generated; identify, for each DTC, a DTC status cycle by merging consecutive ignition cycles during which the DTC is generated with a consistent DTC status associated therewith; and identify, for each DTC, a DTC cycle based at least in part on each DTC status cycle identified for the DTC.

According to an embodiment, the method further comprises operating the at least one processor to aggregate identical DTCs having different DTC statuses associated therewith generated during the same ignition cycle to thereby generate an aggregated DTC having an aggregated DTC status associated therewith.

According to a further embodiment, the determining of the ignition cycle during which the DTC is generated comprises operating the at least one processor to: identify the ignition cycle based on a time of engaging an ignition of the vehicle, and a time of disengaging the ignition of the vehicle; and determine that the DTC is generated after the time of engaging the ignition of the vehicle and before the time of disengaging the ignition of the vehicle or within a predetermined threshold of time after the time of disengaging the ignition of the vehicle.

According to a further embodiment, the identifying of the DTC status cycle comprises operating the at least one processor to: identify each ignition cycle during which the DTC with the consistent DTC status associated therewith is generated; and merge the consecutive ignition cycles during which the DTC with the consistent DTC status is generated such that a start time of a first ignition cycle of the consecutive ignition cycles corresponds to a start time of the DTC status cycle and an end time of a last ignition cycle of the consecutive ignition cycles corresponds to an end time of the DTC status cycle.

According to a further embodiment, the identifying of the DTC status cycle further comprises operating the at least one processor to: identify each ignition cycle completed by the vehicle within a selected time period; and filter any ignition cycles occurring within the selected time period that do not meet a predetermined condition.

According to a further embodiment, the predetermined condition comprises a minimum ignition cycle time, a minimum number of DTCs generated during the ignition cycle, or a combination thereof.

According to a further embodiment, the identifying of the valid DTC cycle is based on the DTC status cycle comprising a minimum number of consecutive ignition cycles, a minimum number of consecutive ignition cycles during which the DTC with the consistent DTC status associated therewith is associated, or a combination thereof.

In another aspect, the present disclosure relates to a non-transitory computer-readable medium having instructions stored thereon executable by at least one processor to implement a method for identifying valid diagnostic trouble codes generated by a vehicle, the method comprising operating at least one processor to: receive telematics data originating from a plurality of telematics devices installed in a plurality of vehicles; identify, using the telematics data, a DTC generated by one or more of the plurality of vehicles, each DTC having a DTC status associated therewith; determine, for each DTC, the ignition cycle during which the DTC was generated; identify, for each DTC, a DTC status cycle by merging consecutive ignition cycles during which the DTC is generated with a consistent DTC status associated therewith; and identify, for each DTC, a DTC cycle based at least in part on each DTC status cycle identified for the DTC.

Other aspects and features of the systems and methods of the present disclosure will become apparent to those ordinarily skilled in the art upon review of the following description of specific embodiments.

BRIEF DESCRIPTION OF THE DRAWINGS

These and other features of the present disclosure will become more apparent in the following detailed description in which reference is made to the appended drawings. The appended drawings illustrate one or more embodiments of the present disclosure by way of example only and are not to be construed as limiting the scope of the present disclosure.

DETAILED DESCRIPTION

As will be appreciated, assessing vehicle operability is important for avoiding vehicle breakdowns, which are often to, for example, towing costs, component costs, labour costs, costs incurred from the non-operability of the vehicle (i.e., the vehicle downtime wherein the vehicle is not able to generate income), etc. As will be appreciated, such costs may be of particular concern for fleet managers, as the costs may be compounded across a fleet of hundreds or even thousands of vehicles.

Telematics data is often used to monitor, and maintain, the operability of a vehicle. In more detail, telematics data such as, but not limited to, engine data, fluid level data, brake data, transmission data, and the like may be used to determine that a vehicle requires maintenance before the operability of the vehicle is impacted (e.g., a breakdown). One type of telematics data conventionally used in the monitoring of vehicle operability are Diagnostic Trouble Codes (DTCs). As described herein, DTCs are strings of letters and numbers generated by a vehicle when a particular potential operational is detected (e.g., by the computer-based systems thereof). However, as also described herein, while DTCs may be useful for identifying specific operational issues with a vehicle, the generation of DTCs by vehicles may be unreliable. For example, a vehicle may incorrectly generate a DTC, or incorrectly cease generating a DTC, due to an error with a sensor thereof (e.g., caused by the movement of the vehicle). As a result, the lifespan, or cycle of a DTC may be misrepresented (e.g., incorrectly determined to have terminated), limiting the usefulness of the DTCs generated by a vehicle for assessing the operability thereof.

It is therefore an object of the present disclosure to provide advantageous systems and methods for identifying valid DTCs.

In more detail, in some embodiments, the systems and methods of the present disclosure may be capable of distinguishing between valid and invalid DTCs based at least in part on the generating, or reporting, thereof during vehicle ignition cycles. In such embodiments, the systems and methods described herein may therefore be employed to identify DTCs generated in response to an actual vehicle issue (i.e., a "valid" DTC) versus, for example, a false positive DTC generated due to an error in the computer-based systems of the vehicle, so that the operability of the vehicle may be more accurately monitored.

Additional advantages will be discussed below and will be readily apparent to those of ordinary skill in the art upon reading the present disclosure.

Reference will now be made in detail to example embodiments of the disclosure, wherein numerals refer to like components, examples of which are illustrated in the accompanying drawings that further show example embodiments, without limitation.

Figure 1:
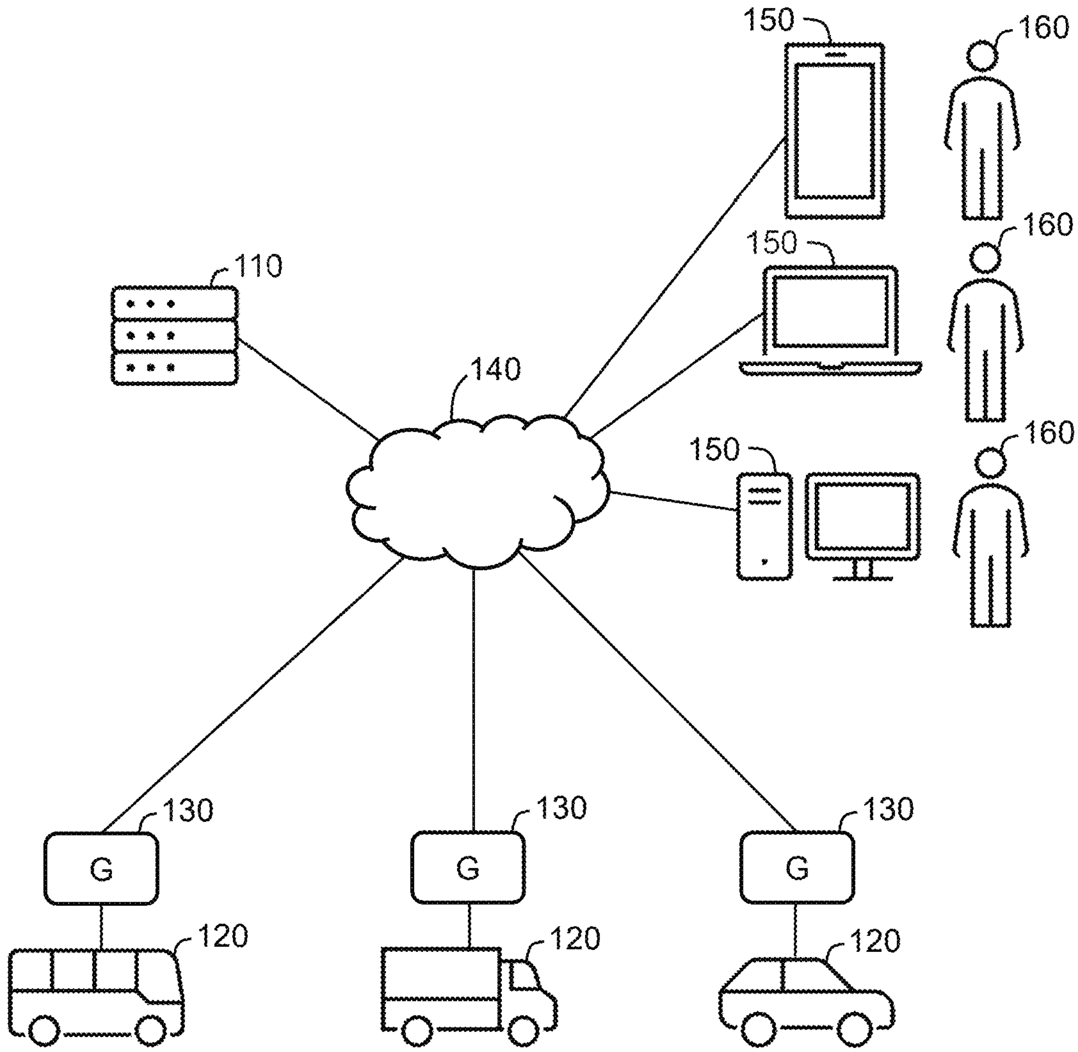
FIG. 1 is a block diagram of various components interacting with an example fleet management system according to an embodiment of the present disclosure.

Referring now to FIG. 1, there is shown an example of a fleet management system 110 for managing a plurality of assets equipped with a plurality of telematics devices 130. Each of the telematics devices 130 is capable of collecting various data from the vehicles 120 (i.e., telematics data) and sharing the telematics data with the fleet management system 110. The fleet management system 110 may be remotely located from the telematics devices 130 and the vehicles 120.

The vehicles 120 may include any type of vehicle. For example, the vehicles 120 may include motor vehicles such as cars, trucks (e.g., pickup trucks, heavy-duty trucks such as class-8 vehicles, etc.), motorcycles, industrial vehicles (e.g., buses), and the like. Each motor vehicle may be a gas, diesel, electric, hybrid, and/or alternative fuel vehicle. Further, the vehicles 120 may include vehicles such as railed vehicles (e.g., trains, trams, and streetcars), watercraft (e.g., ships and recreational pleasure craft), aircraft (e.g., airplanes and helicopters), spacecraft, and the like. Each of the vehicles 120 may be equipped with one of the telematics devices 130.

Further, it is noted that, while only three vehicles 120 having three telematics devices 130 are shown in the illustrated example, it will be appreciated that there may be any number of vehicles 120 and telematics devices 130. For example, the fleet management system 110 may manage hundreds, thousands, or even millions of vehicles 120 and telematics devices 130.

In some embodiments, the telematics devices 130 may be standalone devices that are removably installed in the vehicles 120 (e.g., aftermarket telematics devices). In other embodiments, the telematics devices 130 may be integrated components of the vehicles 120 (e.g., pre-installed by an OEM). As described herein, the telematics devices 130 may collect various telematics data and share the telematics data with the fleet management system 110. The telematics data may include any information, parameters, attributes, characteristics, and/or features associated with the vehicles 120. For example, the vehicle data may include, but is not limited to, location data, speed data, acceleration data, fluid level data (e.g., oil, coolant, and washer fluid), energy data (e.g., battery and/or fuel level), engine data, brake data, transmission data, odometer data, vehicle identifying data, error/diagnostic data, tire pressure data, seatbelt data, airbag data, or a combination thereof. In some embodiments, the telematics data may include information relating to the telematics devices 130 and/or other devices associated with or connected to the telematics devices 130. Regardless, it should be appreciated the telematics data is a form of electronic data that requires a computer (e.g., a processor such as those described herein) to transmit, receive, interpret, process, and/or store.

Once received, the fleet management system 110 may process the telematics data obtained from the telematics devices 130 to provide various analysis, predictions, reporting, etc. In some embodiments, the fleet management system 110 may process the telematics data to provide additional information about the vehicles 120, such as, but not limited to, trip distances and times, idling times, harsh braking and driving, usage rates, fuel economy, and the like. Various data analytics may be implemented to process the telematics data. The telematics data may then be used to manage various aspects of the vehicles 120, such as route planning, vehicle maintenance, driver compliance, asset utilization, fuel management, etc., which, in turn, may improve productivity, efficiency, safety, and/or sustainability of the vehicles 120.

A plurality of computing devices 150 may provide access to the fleet management system 110 to a plurality of users 160. The users 160 may use computing devices 150 to access or retrieve various telematics data collected and/or processed by the fleet management system 110 to manage and track the vehicles 120. As will be appreciated, the computing devices 150 may be any suitable computing devices. For example, the computing devices 150 may be any type of computers such as, but not limited to, personal computers, portable computers, wearable computers, workstations, desktops, laptops, smartphones, tablets, smartwatches, personal digital assistants (PDAs), mobile devices, and the like. The computing devices 150 may be remotely located from the fleet management system 110, telematic devices 130, and vehicles 120.

The fleet management system 110, telematics devices 130, and computing devices 150 may communicate through a network 140. The network 140 may comprise a plurality of networks and may be wireless, wired, or a combination thereof. As will be appreciated, the network 140 may employ any suitable communication protocol and may use any suitable communication medium. For example, the network 140 may comprise Wi-Fi™ networks, Ethernet networks, Bluetooth™ networks, near-field communication (NFC) networks, radio networks, cellular networks, and/or satellite networks. The network 140 may be public, private, or a combination thereof. For example, the network 140 may comprise local area networks (LANs), wide area networks (WANs), the internet, or a combination thereof. Of course, as will also be appreciated, the network 140 may also facilitate communication with other devices and/or systems that are not shown.

Further, the fleet management system 110 may be implemented using one or more computers. For example, the fleet management system 110 may be implements using one or more computer servers. The servers may be distributed across a wide geographical area. In some embodiments, the fleet management system 110 may be implemented using a cloud computing platform, such as Google Cloud Platform™ and Amazon Web Services™. In other embodiments, the fleet management system 110 may be implemented using one or more dedicated computer servers. In a further embodiment, the fleet management system 110 may be implemented using a combination of a cloud computing platform and one or more dedicated computer servers.

Figure 2:
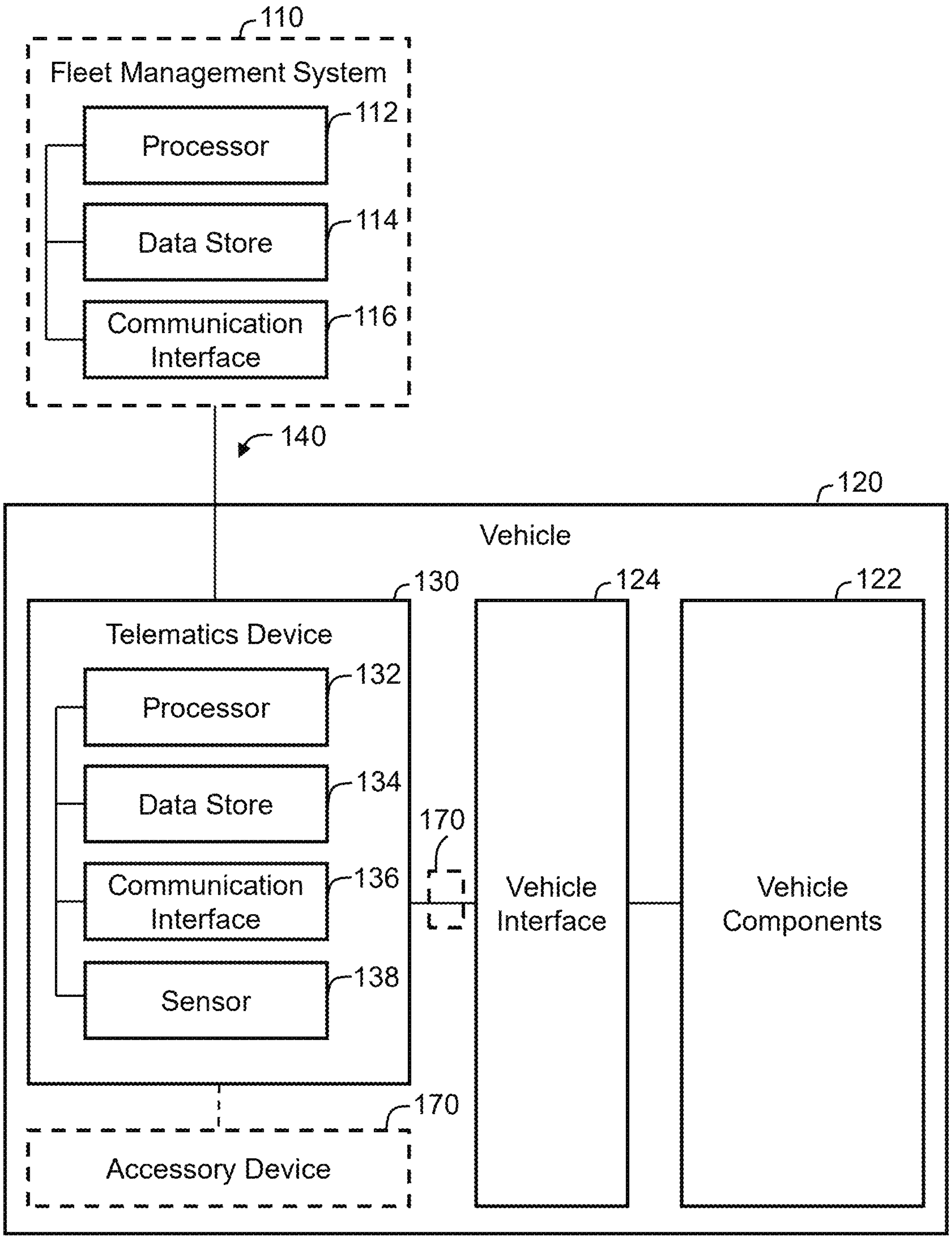
FIG. 2 is a block diagram of an example fleet management system interacting with an example telematics device and an example vehicle, according to an embodiment of the present disclosure.

Referring now to FIG. 2, there is illustrated the fleet management system 110 in communication with one of the telematics devices 130 that is installed in one of the vehicles 120. As shown, the fleet management system 110 may include a processor 112, a data storage 114, and a communication interface 116, each of which may communicate with each other. The processor 112, the data storage 114, and the communication interface 116 may be combined into fewer components, divided into additional subcomponents, or a combination thereof. The components and/or subcomponents may not necessarily be distributed in proximity to one another and may instead be distributed across a wide geographical area.

The processor 112 may control the operation of the fleet management system 110. As will be appreciated, the processor 112 may be implemented using one or more suitable processing devices or systems. For example, the processor 112 may be implemented using central processing units (CPUs), graphics processing units (GPUs), field programmable gate arrays (FPGAs), application specific integrated circuits (ASICs), digital signal processors (DSPs), neural processing units (NPUs), quantum processing units (QPUs), microprocessors, controllers, and the like. The processor 112 may execute various instructions, programs, software, or a combination thereof stored on the data storage 114 to implement various methods described herein. For example, the processor 112 may process various telematics data collected by the fleet management system 110 from the telematics devices 130.

Various data for the fleet management system 110 may be stored on the data storage 114. The data storage 114 may be implemented using one or more suitable data storage devices or systems such as random-access memory (RAM), read only memory (ROM), flash memory, hard disk drives (HDDs), solid-state drives (SSDs), magnetic tape drives, optical disc drives, memory cards, and the like. The data storage 114 may include volatile memory, non-volatile memory, or a combination thereof. Further, the data storage 114 may comprise non-transitory computer readable media. The data storage 114 may store various instructions, programs, and/or software that are executable by the processor 112 to implement various methods described herein. The data storage 114 may store various telematics data collected from the telematics devices 130 and/or processed by the processor 112.

The communication interface 116 may enable communication between the fleet management system 110 and other devices and/or systems, such as the telematics devices 130. The communication interface 116 may be implemented using any suitable communications devices and/or systems. For example, the communication interface 116 may comprise one or more various physical connectors, ports, or terminals such as universal serial bus (USB), ethernet, Thunderbolt, Firewire, serial advanced technology attachment (SATA), peripheral component interconnect (PCI), high-definition multimedia interface (HDMI), DisplayPort, and the like. As another example, the communication interface 116 may comprise one or more wireless interface components to connect to wireless networks such as Wi-Fi™, Bluetooth™, NFC, cellular, satellite, and the like. The communication interface 116 may enable various inputs and outputs to be received at and sent from the fleet management system 110. For example, the communication interface 116 may be used to telematics data from the telematics devices 130.

The telematics devices 130 also may include a processor 134, a data storage 134, and a communication interface 136. The telematics devices 130 may also comprise a sensor 138. Each of the components of the telematics devices 130 may communicate with each other and may be combined into fewer components or divided into additional subcomponents.

The processor 132 may control the operation of the telematics device 130. The processor 132 may be implemented using any suitable processing devices or systems, such as those described above in relation to the processor 112 of the fleet management system 110. The processor 132 may execute various instructions, programs, software, or a combination thereof stored on the data storage 134 to implement various methods described herein. For example, the processor 132 may process various telematics data obtained from vehicle components 122 and/or the sensor 138.

The data storage 134 may store various data for the telematics device 130. The data storage 134 may be any suitable data storage device or system, such as those described above in relation to the data storage 114 of the fleet management system 110. The data storage 134 may store various instructions, programs, software, or a combination thereof executable by the processor 132 to implement various methods described herein. As well, the data storage 134 may store various telematics data obtained from the vehicle components 122 and/or the sensor 138.

The communication interface 136 may enable communication between the telematics devices 130 and other devices or systems, such as the fleet management system 110 and the vehicle components 122. The communication interface 136 may comprise any suitable communication devices or systems, such as those described above in relation to the communication interface 116 of the fleet management system 110. The communication interface 136 may enable various inputs and outputs to be received at and sent from the telematics devices 130. For example, the communication interface 136 may be used to collect vehicle data from the vehicle components 122 and/or sensor 138, to send vehicle data to the fleet management system 110, etc.

The sensor 138 may detect and/or measure various environmental events, changes, etc. The sensor 138 may include any suitable sensing devices or systems, such as, but not limited to, location sensors, velocity sensors, acceleration sensors, orientation sensors, vibration sensors, proximity sensors, temperature sensors, humidity sensors, pressure sensors, optical sensors, audio sensors, and combinations thereof. When the telematics device 130 is installed in the vehicle 120, the sensor 138 may be used to collect telematics data that may not be obtainable from the vehicle components 122. For example, the sensor 138 may include a satellite navigation device such as a global positioning system (GPS) receiver that may measure the location of the vehicle 120. In some embodiments, the sensor 138 may comprise accelerometers, gyroscopes, magnetometers, inertial measurement units (IMUs), or the like that may measure the acceleration and/or orientation of the vehicle 120.

In some embodiments, the telematics devices 130 may operate in conjunction with one or more accessory devices 170 that are in communication therewith. The accessory devices 170 may include one or more expansion devices that may provide additional functionality to the telematics devices 130. For example, the accessory devices 170 may provide additional processing storage, communication, and/or sensing functionality through one or more additional processors, data storages, communication interfaces, and/or sensors (not pictured). The accessory devices 170 may also include adaptor devices that facilitate communication between the communication interface 136 and one or more vehicle interfaces 124, such as a cable harness. The one or more accessory devices 170 may be installed in the vehicle 120 along with the telematics devices 130.

As described herein, the telematics device 130 may be installed within the vehicle 120 removably or integrally. The vehicle 120 may include the vehicle components 122 and the one or more vehicle interfaces 124, which, as will be appreciated, may be combined into fewer components or divided into additional subcomponents. In some embodiments, the vehicle components 122 may comprise any subsystems, parts, subcomponents, or combinations thereof of the vehicle 120. For example, the vehicle components 122 may comprise powertrains, engines, transmissions, steering, braking, seating, batteries, doors, suspensions, etc. The telematics device 130 may obtain various telematics data from the vehicle components 122. For example, in some embodiments, the telematics device 130 may communicate with one or more electrical control units (ECUs) that control the vehicle components 122 or one or more internal sensors thereof.

The vehicle interface 124 may facilitate communication between the vehicle components 122 and other devices or systems. As well, the vehicle interface 124 may comprise any suitable communication devices or systems. For example, the vehicle interface 124 may include an on-board diagnostics (OBD-II) port and/or controller area network (CAN) bus port. The vehicle interface 124 may be used by the telematics device 130 to obtain telematics data from the vehicle components 122. For example, the communication interface 136 may be connected to the vehicle interface 124 to communicate with the vehicle components 122. In some embodiments, the one or more accessory devices 170 (e.g., a wire harness) may provide the connection between the communication interface 136 and the vehicle interface 124.

Figure 3:
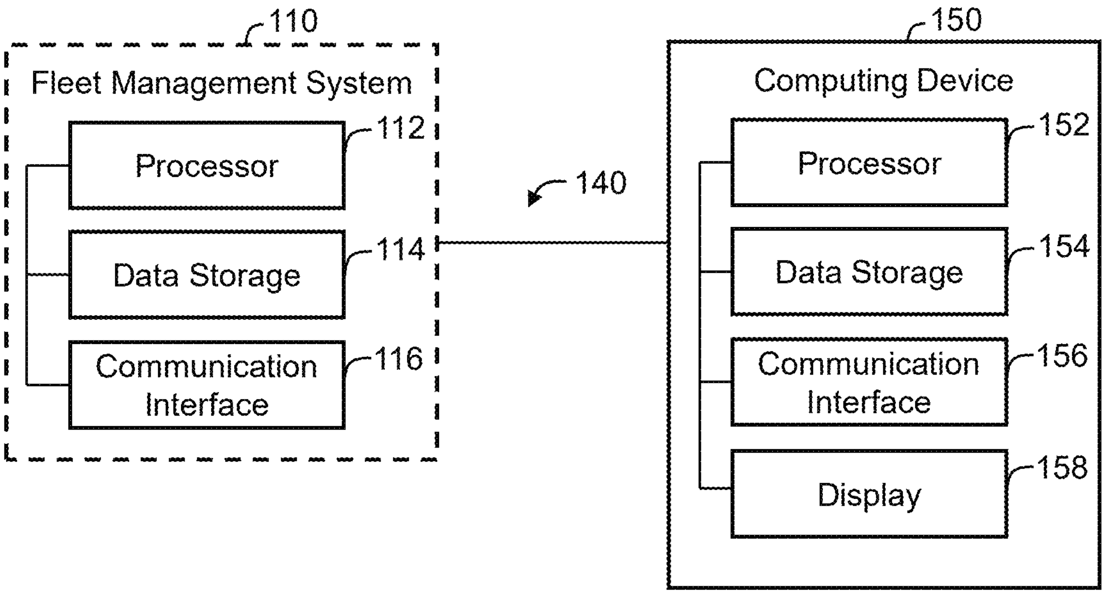
FIG. 3 is a block diagram of an example computing device interacting with an example fleet management system, according to an embodiment of the present disclosure.

Referring now to FIG. 3, there is shown the fleet management system 110 in communication with the computing devices 150. As shown, the computing device 150 may also include a processor 152, a data storage 153, and a communication interface 156. As well, the computing device 150 may include a display 158. Each of the components of the computing device 150 may be communicate with each other and may be combined into fewer components or divided into additional subcomponents.

The processor 152 may control the operation of the computing device 150. The processor 152 may be implemented using any suitable processing devices or systems, such as those described above in relation to the processor 112 of the fleet management system 110. The processor 152 may execute various instructions, programs, software, or a combination thereof stored on the data storage 154 to implement various methods described herein. For example, the processor 152 may process various telematics data received from the fleet management system 110, the telematics devices 130, or a combination thereof.

The data storage 154 may store various data for the computing device 150. The data storage 150 may be any suitable data storage device or system, such as those described above in relation to the data storage 114 of the fleet management system 110. The data storage 154 may store various instructions, programs, software, or a combination thereof executable by the processor 152 to implement various methods described herein. As well, the data storage 154 may store various telematics data received from the fleet management system 110, the telematics devices 130, or a combination thereof.

The communication interface 156 may enable communication between the computing device 150 and other devices or systems, such as the fleet management system 110. The communication interface 156 may be any suitable communication device or system, such as those described above in relation to the communication interface 116 of the fleet management system 110. The communication interface 156 may enable various inputs and outputs to be received at and sent from the computing device 150. For example, the communication interface 156 may be used to retrieve telematics data the fleet management system 110.

The displays 158 may visually present various data for the computing device 150. The displays 158 may be implemented using any suitable display devices or systems, such as, but not limited to, light-emitting diode (LED) displays, liquid crystal displays (LCD), electroluminescent displays (ELDs), plasma displays, quantum dot displays, cathode ray tube (CRT) displays, and the like. The display 158 may be an integrated component that is integral with the computing device 150 or a standalone device that is removable connected to the computing device 150. The display 158 may display various visual representations of the telematics data.

Figure 4:
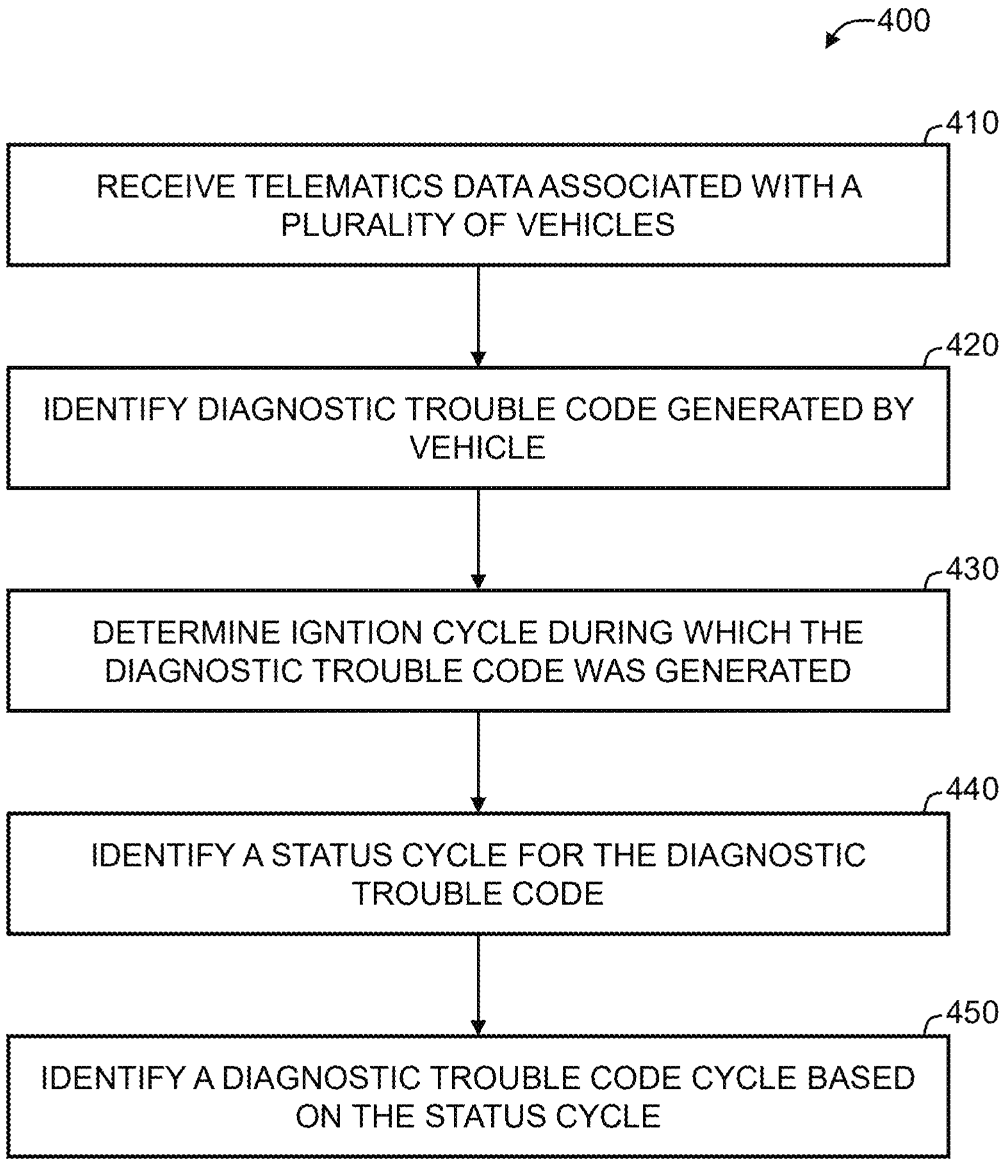
FIG. 4 is a flowchart of an example method for identifying a diagnostic trouble code of a vehicle according to an embodiment of the present disclosure.

Referring now to FIG. 4, there is shown an example method for identifying a valid DTC cycle (400), the method 400 comprising operating at least one processor to: receive telematics data originating from a plurality of telematics devices installed in a plurality of vehicles (410); identify, using the telematics data, a DTC generated by one or more of the plurality of vehicles, each DTC having a DTC status associated therewith (420); determine, for each DTC, an ignition cycle during which the DTC was generated (430); identify, for each DTC, a DTC status cycle by merging consecutive ignition cycles during which the DTC is generated with a consistent DTC status associated therewith (440); and identify a valid DTC cycle based at least in part on a number of consecutive ignition cycles of the DTC status cycle (450).

The inventors of the present disclosure surprisingly found that, by associating DTCs generated by a vehicle with the ignition cycles of the vehicle as indicated above, valid DTC cycles (i.e., periods of time during which a DTC is being generated by the vehicle) may be identified. As described herein, such valid DTC cycles may be useful for a number of downstream applications such as those relating to predictive vehicle maintenance, as the valid DTC cycles may accurately reflect potential operational issues experienced by the vehicle. As also described herein, DTCs may conventionally be unreliable for such downstream applications due to, for example, the generation of false positive DTCs by vehicles, DTCs generated by the vehicle not being reported (e.g., due to an error with an integrated OEM telematics device), etc.

The method 400 may be implemented using any suitable combination of hardware and software, such as those described in reference to FIG. 1 to FIG. 3. For example, one or more operations (e.g., operations 410, 420, 430, 440, and/or 450) of the method 400 may be implemented at the fleet management system (e.g., by the processor 112 executing instructions stored on the data storage 114), at the telematics device 130 (e.g., by the processor 132 executing instructions stored on the data storage 134), at the computing devices 150 (e.g., by the processor 152 executing instructions stored on the data storage 154), or a combination thereof.

At operation 410, telematics data originating from a plurality of telematics devices installed in a plurality of vehicles may be received.

In more detail, the telematics data may be obtained from the plurality of vehicles using, for example, one or more of the systems outlined in FIG. 1 to FIG. 3. For example, the telematics device 130 (e.g., the processor 132) may receive telematics data from the sensor 138, vehicle components 122, or a combination thereof. Alternatively, or additionally, the fleet management system 110 (e.g., the processor 112) may receive telematics data from the telematics device 130. Additionally, or alternatively, the computing device 150 (e.g., the processor 152) may receive telematics data from the telematics device 130 and/or the fleet management system 110. Additionally, or alternatively, the telematics device 130, the fleet management system 110, and/or the computing device 150 may receive telematics data from one or more data storages (e.g., one or more of the data storages 114, 134, 154).

As described herein, the systems and methods of the present disclosure may identify valid DTC cycles based at least in part on DTCs generated, or reported, by a vehicle and the ignition cycles (i.e., the periods of time where the ignition is engaged or "on") of that vehicle. Thus, the telematics data may generally comprise DTC data (e.g., as a portion of all error/diagnostic data) as well as ignition data (e.g., as a portion of all engine data). As will be appreciated, the DTC data may indicate any DTCs generated by the vehicle, while the igntion data may indicate when the ignition of the vehicle is engaged (i.e., turned "on") and disengaged (i.e., turned "off"). In some embodiments, the telematics data may include other types of data related to the DTC data and ignition data such as, but not limited to, geospatial data (e.g., a location of the vehicle at the time of the generation of the DTC), time data (e.g., the time at which the ignition of the vehicle was engaged), etc.

Further, in some embodiments, some embodiments, the telematics data may be preprocessed prior to and/or subsequently to being received. For example, the telematics data may be received in one or more various formats, standards, or protocols. In some cases, it may be beneficial to reformat the telematics data prior to use in the systems and methods of the present disclosure. As a further example, the telematics data may include datapoints reported at irregular frequencies and/or that correspond to mismatched points in time. In such cases, the telematics data may be interpolated so that the datapoints in each time series correspond to successive and/or equally spaced points in time. As a yet further example, and as will be described herein, the telematics data may be curve-logged telematics data, which may result in a reduced number of received datapoints. In such implementations, the reduced number of datapoints may be interpolated to provide a fulsome dataset.

At operation 420 of the method 400, a DTC generated by one or more of the plurality of vehicles may be identified. As described herein, vehicles generally generate DTCs when a potential operational issue is detected (e.g., by one or more sensors 108) thereof. As also described herein, DTCs are typically formatted as unique strings of letters and numbers, wherein each unique string represents a specific potential vehicle operational issue. Once generated, the DTCs may be logged, reported, etc. by, for example, the telematics device 130.

Further, each generated DTC may typically have a DTC status associated therewith. The DTC status may indicate the activity of the associated DTC. For example, a DTC may have a "pending" status associated therewith if the DTC is newly generated (e.g., has been generated for only one ignition cycle) or a "confirmed" status when the DTC has been generated long enough to be written to a memory of the computer-based systems of the vehicle (e.g., has been generated for a plurality of ignition cycles).

Referring now to operation 430 of the method 400, an ignition cycle during which the DTC was generated may be identified. As indicated above, an "ignition cycle" may generally refer to a period of time between the ignition of a vehicle being engaged and disengaged (i.e., between ignition "on" and ignition "off").

The particular ignition cycle during which the DTC is generated may be determined using any suitable technique. For example, in some embodiments, a time at which the DTC is generated may be compared to a time of engaging an ignition of the vehicle and a time of disengaging the ignition of the vehicle to determine that the DTC was generated therebetween.

However, the inventors of the present disclosure also surprisingly found that DTCs may in some cases be generated and/or reported outside of ignition cycles. Such cases may arise when, for example, when an ignition cycle so short that the telematics device does not have time to detect and report a generated DTC during the ignition cycle. As a result, in such cases, the DTC may appear to be generated after the vehicle ignition is disengaged. It may therefore be useful to account for such cases when determine the ignition cycle during which the DTC is generated. For example, in some embodiments, the determining of the ignition cycle during which the DTC is generated may comprise\operating the at least one processor to: identify the ignition cycle based on a time of engaging an ignition of the vehicle, and a time of disengaging the ignition of the vehicle; and determine that the DTC is generated after the time of engaging the ignition of the vehicle and before the time of disengaging the ignition of the vehicle or within a predetermined threshold of time after the time of disengaging the ignition of the vehicle. In such embodiments, the predetermined threshold of time may be any suitable threshold. For example, the threshold may be 60 seconds after the time of disengaging the ignition of the vehicle, 120 seconds after the time of disengaging the ignition of the vehicle, any amount of time after the time of disengaging the ignition of the vehicle but before a subsequent time of reengaging the ignition of the vehicle (i.e., the start of another ignition cycle), etc.

Referring now to operation 440, a DTC status cycle for each generated DTC may be identified. As used herein, a "DTC status cycle" may generally refer to a period during which a particular DTC having a particular status associated therewith is generated by the vehicle. The DTC status cycle may be determined using ignition cycles during which the DTC is generated with a consistent DTC status associated therewith (i.e., the DTC status associated therewith does not change between ignition cycles).

For example, in some embodiments, the identifying of the DTC status cycle may comprise operating the at least one processor to: identify each ignition cycle during which the DTC is generated with the consistent DTC status; and merge the consecutive ignition cycles during which the DTC with the consistent DTC status is generated such that a start time of a first ignition cycle of the consecutive ignition cycles corresponds to a start time of the DTC status cycle and an end time of a last ignition cycle of the consecutive ignition cycles corresponds to an end time of the DTC status cycle.

However, as indicated herein, the generation of DTCs by the vehicle may be prone to error (e.g., false positives, false negatives, etc.) due to, for example, the movement of the vehicle during normal operation affecting one or more sensors thereof, an integrated OEM telematics device not reporting a generated DTC code, etc. As one example, it may be the case that a particular DTC may have a "pending" status associated therewith at the beginning of an ignition cycle and a "confirmed" DTC status associated therewith during that same ignition cycle. As another example, a particular DTC may erroneously not be generated (i.e., a false negative) during a particular ignition cycle. As will be appreciated, such errors may affect the identification of consecutive ignition cycles during which a particular DTC having a particular, consistent DTC status associated therewith and, in turn, the identification of the DTC status cycles.

The inventors of the present disclosure found a number of surprising techniques to mitigate the effects of such above-described errors.

For example, in some embodiments, the method 400 may further comprise operating the at least one processor to aggregate identical DTCs having different DTC statuses associated therewith generated during the same ignition cycle to thereby generate an aggregated DTC having an aggregated DTC status associated therewith. In such embodiments, identical DTCs (i.e., the same string of letters and numbers) generated during the same ignition cycle that have different DTC statuses associated therewith may be aggregated to be considered as a single DTC having a single DTC status associated therewith. For example, a particular DTC having a "pending" DTC status associated therewith may be aggregated with another instance of that particular DTC having a "confirmed" DTC status associated therewith to produce a single instance of the particular DTC having an aggregated "pending and confirmed" DTC status associated therewith, thereby facilitating the identification of the DTC status cycle.

In a further example, in some embodiments, the identifying of the DTC status cycle may further comprise operating the at least one processor to identify each ignition cycle completed by the vehicle within a selected time period; and filter any ignition cycles not meeting a predetermined condition. In such embodiments, the selected time period may be any suitable time period. For example, the selected time period may be the period of time between the implementation of the systems and methods of the present disclosure and the first time at which the DTC was generated so as to identify all the ignition cycles that occurred therein.

The predetermined condition may be any selected condition that may indicate that the ignition cycle is not suitable for the generation, or reporting, of the DTC, that the DTC may not have been generated, or reported, erroneously, etc. For example, a particularly short ignition cycle (e.g., 60 seconds or less) may not be enough time for the computer-based systems of the vehicle to identify a potential vehicle operability issue and/or generate a DTC corresponding to that potential vehicle operability issue, or may not be enough time for a telematics device to report the generated DTC. In that example, it may appear that the computer-based systems of the vehicle detected no potential vehicle operational issues, which may not accurately reflect the operability of the vehicle. As another example, an ignition cycle during which no DTCs were generated occurring in the selected time period may indicate that a DTC was erroneously not generated, particularly if a DTC was generated in a subsequent ignition cycle occurring within the selected time period. Thus, in some embodiments, the predetermined condition may comprise, for example, a minimum ignition cycle duration, a minimum number of DTCs generated during the ignition cycle, or a combination thereof.

Referring now to operation 450 of the method 400, a DTC cycle for each DTC may be identified based at least in part on each DTC status cycle identified for the DTC. That is, the total duration of a DTC (i.e., the DTC cycle) generated by a vehicle may be determined based on the DTC status cycle identified for that DTC. In more detail, as indicated above, a DTC status cycle may represent the duration of a particular DTC being associated with a particular DTC status (e.g., "pending", "confirmed", "pending and confirmed, etc.). As will be appreciated, a particular DTC may in some cases have multiple DTC status cycles identified therefor, as the DTC may be generated with a particular DTC status associated therewith for a number of consecutive ignition cycles and a different particular DTC status associated therewith for a number of other consecutive ignition cycles. Thus, the total duration of a particular DTC may correspond to multiple DTC status cycles for that DTC. Of course, if there are not multiple DTC status cycles for a generated DTC, the DTC cycle may be based on the single DTC status cycle for that DTC.

For example, in some embodiments, the identifying of the DTC cycle 450 may comprise operating the at least one processor to merge consecutive DTC status cycles identified for the DTC. In such embodiments, the merging may be performed in the same manner as described above in relation to the merging of consecutive ignition cycles. For example, an ignition cycle during which no DTCs are generated occurring between the DTC status cycles may be filtered.

However, it may be the case that a number of consecutive ignition cycles during which no DTCs, or a particular DTC, are generated may indicate that the DTC cycle has terminated. For example, a plurality of consecutive ignition cycles during which a particular DTC is not generated may indicate that the vehicle operational issue corresponding to that particular DTC has been addressed and, in turn, that the DTC cycle for that particular DTC has terminated. Thus, in some embodiments, the identifying of the DTC cycle 450 may be further based on a number of consecutive ignition cycles occurring subsequent to each DTC status cycle identified for the DTC during which the DTC is not generated. The number of consecutive ignition cycles during which the DTC is not generated is not particularly limited. For example, in some embodiments, the number of consecutive ignition cycles during which the DTC is not generated comprises 5, 10, 20, or more, or fewer, ignition cycles.

As will be appreciated, once the DTC cycle is identified, the DTC cycle may, in turn, be used to assess vehicle operability (e.g., determine if a DTC cycle has terminated) and service the vehicle, if so required, to address the DTC of the DTC cycle.

In light of the above, the systems and methods of the present disclosure may accurately identify DTC cycles at least in part by reducing the influence of erroneous data (e.g., false positive DTCs, false negative DTCs, etc.) and considering the DTC statuses associated with the generated DTCs. As a result, the lifespan (or, put differently, the total duration) of a particular DTC generated by a vehicle may be determined and used for various downstream applications such as, but not limited to, the monitoring and/or assessing of vehicle operability (e.g., by a remote vehicle fleet manager).

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

As used herein, the term "about" refers to an approximately +/−10% variation from a given value. It is to be understood that such a variation is always included in any given value provided herein, whether or not it is specifically referred to.

It should be understood that the compositions and methods are described in terms of "comprising," "containing," or "including" various components or steps, the compositions and methods can also "consist essentially of or "consist of the various components and steps. Moreover, the indefinite articles "a" or "an," as used in the claims, are defined herein to mean one or more than one of the element that it introduces.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

The Drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware. Further, mention of data or information being stored at a device generally refers to the data information being stored at a non-transitory processor-readable storage medium of said device.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

Many obvious variations of the embodiments set out herein will suggest themselves to those skilled in the art in light of the present disclosure. Such obvious variations are within the full intended scope of the appended claims.

The invention claimed is:

1. A system for identifying a diagnostic trouble code (DTC) cycle of a vehicle, the system comprising:

at least one data storage operable to store telematics data originating from a plurality of telematics devices installed in a plurality of vehicles; and at least one processor in communication with the at least one data storage, the at least one processor operable to:

identify, using the telematics data, a DTC generated by one or more of the plurality of vehicles, each DTC having a DTC status associated therewith;

determine, for each DTC, the ignition cycle during which the DTC was generated;

identify, for each DTC, a DTC status cycle by merging consecutive ignition cycles during which the DTC is generated with a consistent DTC status associated therewith; and identify, for each DTC, a DTC cycle based at least in part on each DTC status cycle identified for the DTC.

2. The system of claim 1, wherein the at least one processor is further operable to aggregate identical DTCs having different DTC statuses associated therewith generated during the same ignition cycle to thereby generate an aggregated DTC having an aggregated DTC status associated therewith.

3. The system of claim 1, wherein the at least one processor is operable to determine the ignition cycle during which the DTC is generated by:

identifying the ignition cycle based on a time of engaging an ignition of the vehicle, and a time of disengaging the ignition of the vehicle; and determining that the DTC is generated after the time of engaging the ignition of the vehicle and before the time of disengaging the ignition of the vehicle or within a predetermined threshold of time after the time of disengaging the ignition of the vehicle.

4. The system of claim 1, wherein the at least one processor is operable to identify the DTC status cycle by:

identifying each ignition cycle during which the DTC with the consistent DTC status associated therewith is generated; and merging the consecutive ignition cycles during which the DTC with the consistent DTC status is generated such that a start time of a first ignition cycle of the consecutive ignition cycles corresponds to a start time of the DTC status cycle and an end time of a last ignition cycle of the consecutive ignition cycles corresponds to an end time of the DTC status cycle.

5. The system of claim 4, wherein the at least one processor is further operable to identify the DTC status cycle by:

identifying each ignition cycle completed by the vehicle within a selected time period; and filtering any ignition cycles occurring within the selected time period that do not meet a predetermined condition.

6. The system of claim 5, wherein the predetermined condition comprises a minimum ignition cycle time, a minimum number of DTCs generated during the ignition cycle, or a combination thereof.

7. The system of claim 1, wherein the at least one processor is operable to identify the DTC cycle by merging consecutive DTC status cycles identified for the DTC.

8. A method for identifying a diagnostic trouble code (DTC) cycle of a vehicle, the method comprising operating at least one processor to:

receive telematics data originating from a plurality of telematics devices installed in a plurality of vehicles;

identify, using the telematics data, a DTC generated by one or more of the plurality of vehicles, each DTC having a DTC status associated therewith;

determine, for each DTC, the ignition cycle during which the DTC was generated;

identify, for each DTC, a DTC status cycle by merging consecutive ignition cycles during which the DTC is generated with a consistent DTC status associated therewith; and identify, for each DTC, a DTC cycle based at least in part on each DTC status cycle identified for the DTC.

9. The method of claim 8, further comprising operating the at least one processor to aggregate identical DTCs having different DTC statuses associated therewith generated during the same ignition cycle to thereby generate an aggregated DTC having an aggregated DTC status associated therewith.

10. The method of claim 8, wherein the determining of the ignition cycle during which the DTC is generated comprises operating the at least one processor to:

identify the ignition cycle based on a time of engaging an ignition of the vehicle, and a time of disengaging the ignition of the vehicle; and determine that the DTC is generated after the time of engaging the ignition of the vehicle and before the time of disengaging the ignition of the vehicle or within a predetermined threshold of time after the time of disengaging the ignition of the vehicle.

11. The method of claim 8, wherein the identifying of the DTC status cycle comprises operating the at least one processor to:

identify each ignition cycle during which the DTC with the consistent DTC status associated therewith is generated; and merge the consecutive ignition cycles during which the DTC with the consistent DTC status is generated such that a start time of a first ignition cycle of the consecutive ignition cycles corresponds to a start time of the DTC status cycle and an end time of a last ignition cycle of the consecutive ignition cycles corresponds to an end time of the DTC status cycle.

12. The method of claim 11, wherein the identifying of the DTC status cycle further comprises operating the at least one processor to:

identify each ignition cycle completed by the vehicle within a selected time period; and filter any ignition cycles occurring within the selected time period that do not meet a predetermined condition.

13. The method of claim 12, wherein the predetermined condition comprises a minimum ignition cycle time, a minimum number of DTCs generated during the ignition cycle, or a combination thereof.

14. The method of claim 8, wherein the identifying of the DTC cycle comprises operating the at least one processor to merge consecutive DTC status cycles identified for the DTC.

15. A non-transitory computer-readable medium having instructions stored thereon executable by at least one processor to implement a method for identifying valid diagnostic trouble codes generated by a vehicle, the method comprising operating at least one processor to:

receive telematics data originating from a plurality of telematics devices installed in a plurality of vehicles;

identify, using the telematics data, a DTC generated by one or more of the plurality of vehicles, each DTC having a DTC status associated therewith;

determine, for each DTC, the ignition cycle during which the DTC was generated;

identify, for each DTC, a DTC status cycle by merging consecutive ignition cycles during which the DTC is generated with a consistent DTC status associated therewith; and identify, for each DTC, a DTC cycle based at least in part on each DTC status cycle identified for the DTC.

* * * * *